United States Patent [19]

Cecil et al.

[11] Patent Number: 4,751,600

[45] Date of Patent: Jun. 14, 1988

[54] APPARATUS FOR USE IN CLEANING A TAPE HEAD

[75] Inventors: Don R. Cecil, Abergavenny, Great Britain; Richard P. Evans, Wavre, Belgium

[73] Assignee: Pacevault Limited, Trout Cottage, Great Britain

[21] Appl. No.: 888,564

[22] Filed: Jul. 22, 1986

[30] Foreign Application Priority Data

Apr. 4, 1986 [GB] United Kingdom ................. 8608314

[51] Int. Cl.[4] ................................................ G11B 5/41

[52] U.S. Cl. .................................... 360/128; 360/137

[58] Field of Search .............. 360/128, 137; 15/210 R

[56] References Cited

U.S. PATENT DOCUMENTS

| | | | |
|---|---|---|---|
| 3,655,924 | 4/1972 | Puskas | 360/128 |
| 4,584,620 | 4/1986 | Döpp et al. | 360/128 |
| 4,669,017 | 5/1987 | Blank et al. | 360/128 |

*Primary Examiner*—John H. Wolff

*Attorney, Agent, or Firm*—Marshall, O'Toole, Gerstein, Murray & Bicknell

[57] ABSTRACT

Apparatus for use in cleaning a tape head comprises a cartridge in which there is a frame carrying tape head cleaner in the form of a spindle carrying a foam sponge cleaning roller. For reciprocating the tape head cleaner against a tape head in use of the apparatus, the frame is movable by any one of first, second and third rotatable shafts in the cartridge. The shafts are coupled with the frame and rotation of any one of them about its longitudinal axis causes movement of the frame.

16 Claims, 1 Drawing Sheet

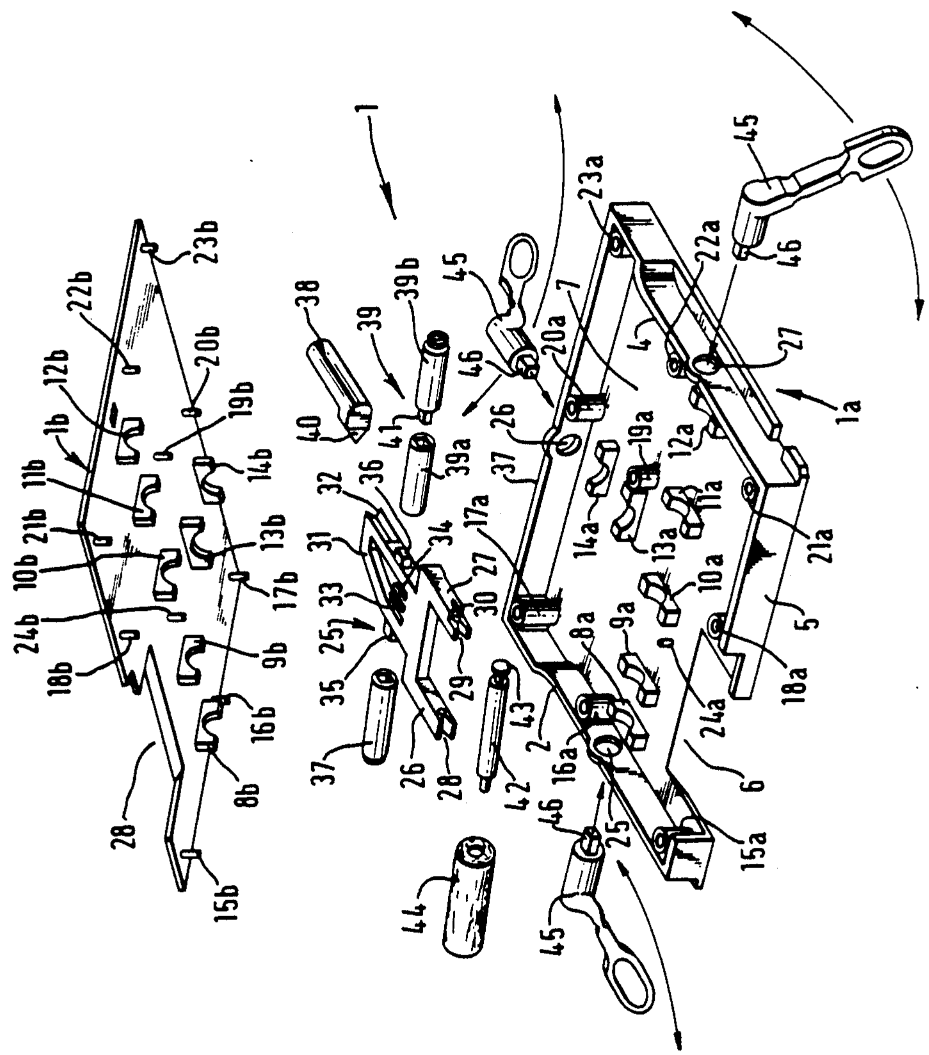

APPARATUS FOR USE IN CLEANING A TAPE HEAD

FIELD AND BACKGROUND OF THE INVENTION

The present invention relates to apparatus for use cleaning a tape head.

Apparatus for use in cleaning a tape head in computer tape read/write equipment is known in the form of a cartridge insertable in place of a tape data cartridge. However, hitherto, each such apparatus has only been suitable for use with a rather limited variety of forms of read/write equipment.

SUMMARY OF THE INVENTION

It is a general object of this invention to provide apparatus that avoids the problems inherent in prior art structures. In accordance with this invention, tape head cleaning apparatus is provided comprising a cartridge, a tape head cleaning device movably mounted in the cartridge, and a mechanism for moving the device against a tape head during use, the mechanism including a plurality of shafts individually coupled to the device and extending in different directions, rotation of any one of the shafts causing movement of the device.

BRIEF DESCRIPTION OF THE DRAWINGS

The present invention will now be described, by way of example, with reference to FIG. 1, which is an exploded view of an embodiment of the present invention.

DETAILED DESCRIPTION OF THE DRAWINGS

Referring to FIG. 1, a cartridge 1 comprises a base 1*a* having a lid 1*b*. The base 1*a* has four side walls 2, 3, 4 and 5, the wall 5 having an opening which communicates with an aperture 6 in the floor 7 of the base 1*a*. The floor 7 of the base 1*a* carries bearing members 8*a*, 9*a*, 10*a*, 11*a*, 12*a*, 13*a* and 14*a*. Also, the base 1*a* carries hollow pillars 15*a*, 16*a*, 17*a*, 18*a*, 19*a*, 20*a*, 21*a*, 22*a* and 23*a* and a lug 24*a*. In the side walls 2, 3 and 4 there are circular access ports 25, 26 and 27 respectively. The base 1*a* and the items 8*a* to 14*a*, 15*a* to 23*a* and 24*a* are formed as an integral plastics moulding.

The lid 1*b* of the cartridge 1 has an aperture 28 which overlies the aperture 6 when the lid 1*b* is fitted to the base 1*a*. Also, the lid 1*b* carries bearing members 8*b*, 9*b*, 10*b*, 11*b*, 12*b*, 13*b* and 14*b* which overlie bearing members 8*a* to 14*a* respectively of the base 1*a* when the lid 1*b* is fitted to the latter, to provide bearings for three shafts which will be described later. The base 1*b* also carries lugs 15*b*, 16*b*, 17*b*, 18*b*, 19*b*, 20*b*, 21*b*, 22*b* and 23*b*, the lid 1*b* being fitted to the base 1*a* by engaging lugs 15*b* to 23*b* in pillars 15*a* to 23*a* respectively of the base 1*a*. Finally, the lid 1*b* carries a lug 24*b* offset sideways from the lug 24*a* of the base 1*a*. The lid 1*b* and the items 8*b* to 14*b*, 15*b* to 23*b* and 24*b* are formed as an integral plastics moulding.

Inside the base 1*a* and the lid 1*b* the cartridge 1 includes a frame 25 in the form of an integral plastics moulding. More particularly, the frame 25 comprises: two side wings 26 and 27 (the free ends of which have notches 28 and 29 respectively); a tooth 30 alongside the notch 29; a rearwardly extending open portion 31, one side of which is formed with a notch 32; a pair of leaf springs 33 and 34 in the opening in the portion 31, leaf spring 33 underlying lug 24*b* and leaf spring 34 overlying lug 24*a*; and a pair of square-section projections 35 and 36 on opposite sides of the portion 31.

Also inside the base 1*a* and the lid 1*b*, the cartridge includes three internally hollow shafts 37, 38 and 39, the latter comprising two shaft portions 39*a* and 39*b*. Shaft 37 is carried by the bearings provided by members 8*a*, 8*b* and 9*a*, 9*b* and, at one end, it has a reduced diameter section which is received in port 25 so that its internal, square-section hollow is accessible from the outside; and, at the other end, it engages by its internal, square-section hollow with projection 35. Shaft 38 is carried by the bearings provided by members 13*a*, 13*b* and 14*a*, 14*b* and, at one end, it has a reduced diameter section which is received in port 26 so that its internal, square-section hollow is accessible from the outside, the other end of shaft 38 being formed with a cam 40 which engages in notch 32 of frame 25. Shaft 39 is carried by the bearings provided by members 10*a*, 10*b*; 11*a*, 11*b*; and 12*a*, 12*b*, one end of shaft portion 39*b* having a reduced diameter section which is received in port 27 so that its internal, square-section hollow is accessible from the outside, a square-section projection 41 on the other end of shaft portion 39*b* being received in the internal, square-section hollow of shaft portion 39*a* at one end of the latter. The other end of shaft portion 39*a* engages by its internal, square-section hollow with projection 36. Shafts 37 and 38 and shaft portions 39*a* and 39*b* of shaft 39 are in the form of plastics mouldings.

A spindle 42 of moulded plastics material is detachably carried by frame 25 by way of reduced diameter end portions of spindle 42 which are fitted by snap-action in notches 28 and 29. Formed integrally with the spindle 42 at one end is a ratchet wheel 43 which bears against tooth 30. Slid on to spindle 42 is a foam sponge cleaning roller 44.

Provided with the cartridge is a key 45 of moulded plastics material, integrally formed with which is a square-section projection 46 which can be inserted, selectively, from the outside into the internal, square-section hollows of shafts 37, 38 and 39 at the ends thereof accessible from the outside by virtue of ports 25, 26 and 27. Thereby, a selected one of shafts 37, 38 and 39 may be rotated, thereby causing rotation of the frame 25 together with the spindle 42 and roller 44.

The above embodiment of the invention comprises a cartridge designed as a cleaner for the read/write heads in drives which process a computer ¼" tape data cartridge. To use the drive aperture and loading guides, the cartridge has similar outer dimensions as a ¼" tape data cartridge, more particularly, the external dimensions of the cartridge being about 15 cm by 10 cm by 1.5 cm.

The principle of operation is to slide the cartridge into the drive so that foam sponge roller 44 is over the normal tape path and thereby pressed up against the read/write head of the drive, so that a cleaning process may be activated by wiping the head with the sponge in a vertical direction, as will be described below.

First, a new spindle 42 with a new roller 44 is inserted into frame 25 by means of a snap-action fit of the reduced diameter portions of spindle 42 into notches 28 and 29, with ratchet wheel 43 against tooth 30. Such insertion is enabled by virtue of the opening in side wall 5 (and via which opening the roller 44 is pressed against the read/write head) and the apertures 6 and 28. Freon is sprayed on to the roller by three sprays from a bottle provided. The cartridge is then pressed home into the aperture of the drive in exactly the same way as the operator would normally load a ¼" tape data cartridge.

The provision of three access ports 25, 26 and 27 and associated shafts means that the cartridge is compatible with front and side loading drives. The projection 46 of key 45 is inserted into the appropriate one of the internal square-section hollows of shafts 37, 38 and 39 (i.e. the one visible when loaded). The projection 46 may be inserted after or before the cartridge is loaded into the drive. The key 45 is shaped to allow for it to be just accessible in one particular drive that uses a 'closed door' technique to activate the head position.

By cranking the key 45 by quarter turns in opposite directions, it will turn the appropriate one of shafts 37, 38 and 39 backwards and forwards, thereby forcing frame 25 to reciprocate in upwards and downwards directions away from its centre position that has been held by leaf springs 33 and 34 and lugs **24*b* and 24*a*. The rest position will always be central to avoid contaminating the sponge roller on initial insertion. Shafts 37 and 39 move the frame 25 directly, and shaft 38 moves the frame via its cam 40**.

As the frame 25 which holds the spindle 42 and roller 44 is moved downwards, the pressure of the roller against the read/write head will cause the spindle 42 to rotate against the effect of ratchet wheel 43 and tooth 30. On the upward pass, the ratchet wheel 43 holds against tooth 30 and the roller wipes the read/write head to clean it. This repeats on each subsequent downwards pass and upwards pass, so as to present a clean surface of roller 44 to the head on each upwards pass (which surface has been rotated into position on the downwards pass) to make the cleaning action more effective.

After approximately six double actions, the read/-write head should be clean, the cartridge is withdrawn, the spindle 42 and roller 44 are discarded and the process is repeated next time the head is to be cleaned.

We claim:

1. Apparatus for use in cleaning a tape head, comprising:

(a) a cartridge;

(b) movable means in the cartridge, carrying tape head cleaning means; and (c) means for moving said movable means for reciprocating said tape head cleaning means against a tape head in use of the apparatus, said means for moving said movable means comprising first, second and third rotatable shafts in the cartridge, said shafts being individually coupled with said movable means and in three orthogonal directions so as to permit access of each of said shafts from a respective one of three distinct cartridge edges, rotation of any one of said shafts about its longitudinal axis causing movement of said movable means.

2. Apparatus according to claim 1, wherein said first and third shafts are co-axial and said second shaft is perpendicular to said first and third shafts.

3. Apparatus according to claim 2, wherein said movable means comprises a frame, said first and third shafts being coupled with opposite sides of said frame.

4. Apparatus according to claim 3, wherein said second shaft is coupled with said frame via a cam on one of said second shaft and said frame and a groove in the other of said second shaft and said frame.

5. Apparatus according to claim 3, including means for maintaining the frame in a rest position when it is not being reciprocated.

6. Apparatus according to claim 5, wherein said maintaining means comprises leaf spring means on said frame and lug means in said cartridge bearing against said leaf spring means.

7. Apparatus according to claim 1, wherein the movable means comprises a frame, the tape head cleaning means comprising a spindle carried by the frame, the spindle carrying a cleaning roller.

8. Apparatus according to claim 7, wherein said spindle is detachable from said frame.

9. Apparatus according to claim 8, wherein said spindle is carried by said frame via a snap-action engagement of said spindle with said frame.

10. Apparatus according to claim 7, wherein the cartridge includes control means for allowing the spindle to rotate during movement of the frame in one direction and preventing the spindle from rotating during movement of the frame in the opposite direction.

11. Apparatus according to claim 10, wherein said control means comprises a ratchet wheel carried by one of said spindle and said frame and a tooth engaging withsaid ratchet wheel and carried by the other of said spindle and said frame.

12. Apparatus according to claim 7, including means for maintaining the frame in a rest position when it is not being reciprocated.

13. Apparatus according to claim 12, wherein said maintaining means comprises leaf spring means on said frame and lug means in said cartridge bearing against said leaf spring means.

14. Apparatus according to claim 1, wherein said cartridge comprises a base and a lid fitted together, the base and the lid carrying bearing members providing bearings for said shafts.

15. Apparatus according to claim 14, wherein said base and said lid are fitted together via lugs on one of said lid and said base, which lugs engage in corresponding pillars on the other of said lid and said base.

16. Apparatus according to claim 1, wherein each of said shafts is internally hollow whereby means for rotating the shaft can be inserted into the shaft.

* * * * *